(12) United States Patent
Kim

(10) Patent No.: US 10,233,878 B2
(45) Date of Patent: Mar. 19, 2019

(54) METHOD AND APPARATUS FOR CONTROLLING QUANTITY OF SUCTION AIR

(71) Applicant: Hyundai Motor Company, Seoul (KR)

(72) Inventor: Seung-Bum Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 103 days.

(21) Appl. No.: 15/371,050

(22) Filed: Dec. 6, 2016

(65) Prior Publication Data

US 2018/0038292 A1  Feb. 8, 2018

(30) Foreign Application Priority Data

Aug. 2, 2016  (KR) .......................... 10-2016-0098588

(51) Int. Cl.
| F02D 41/00 | (2006.01) |
|---|---|
| F02M 35/104 | (2006.01) |
| F02M 35/10 | (2006.01) |
| F02D 41/04 | (2006.01) |
| F02D 41/06 | (2006.01) |

(Continued)

(52) U.S. Cl.
CPC ....... *F02M 35/10255* (2013.01); *F02B 31/06* (2013.01); *F02D 41/0002* (2013.01); *F02D 41/042* (2013.01); *F02D 41/062* (2013.01); *F02D 41/221* (2013.01); *F02M 35/104* (2013.01); *F02M 35/10373* (2013.01); *F02D 2041/0015* (2013.01)

(58) Field of Classification Search
CPC ............. F02D 41/0002; F02D 41/0097; F02D 41/221; F02D 41/22; F02D 9/10; F02D 9/02; F02D 9/06; F02D 2009/0201; F02D 2041/0015; F02M 35/104; F02M 35/10373; F02M 35/10255; F02M 35/10085; F02M 35/10; F02B 31/00; F02B 31/04; F02B 27/02

See application file for complete search history.

(56) References Cited

U.S. PATENT DOCUMENTS 6,655,348 B1 * 12/2003 Jessberger ............... F02B 31/08
  123/308
6,711,492 B1 * 3/2004 Pursifull ............... F02D 11/107
  123/399

(Continued)

FOREIGN PATENT DOCUMENTS

| JP | H02-016328 A | 1/1990 |
| JP | 2002-522688 A | 7/2002 |

(Continued)

*Primary Examiner* — Lindsay Low
*Assistant Examiner* — George Jin
(74) *Attorney, Agent, or Firm* — Morgan, Lewis & Bockius LLP

(57) ABSTRACT

A method for controlling a position of a flap of a variable port flap control module (VCM) may include determining whether a vehicle state satisfies a predetermined opening condition of the VCM, determining a VCM opening voltage in consideration of tolerance of the flap of the VCM when the vehicle state satisfies the opening condition of the VCM, and controlling the flap of the VCM to be in an opened state by applying the VCM opening voltage to a motor of the VCM when the opening condition of the VCM is satisfied, during an engine starts.

19 Claims, 2 Drawing Sheets

(51) Int. Cl.
  *F02D 41/22* (2006.01)
  *F02B 31/06* (2006.01)

(56) References Cited

U.S. PATENT DOCUMENTS

| | | | |
|---|---|---|---|
| 2008/0059038 A1* | 3/2008 | Yoshida | B60W 50/0205 701/99 |
| 2009/0265076 A1* | 10/2009 | Hirose | F02D 11/106 701/103 |
| 2011/0062358 A1* | 3/2011 | Kawamura | F16K 31/04 251/129.01 |
| 2015/0260108 A1* | 9/2015 | Jung | F02D 41/0002 701/103 |

FOREIGN PATENT DOCUMENTS

| | | |
|---|---|---|
| KR | 10-0305843 B1 | 12/2001 |
| KR | 10-0422615 B1 | 6/2004 |
| KR | 10-2006-0089053 A | 8/2006 |
| KR | 10-2009-0124075 A | 12/2009 |
| KR | 10-2015-0073248 A | 7/2015 |
| KR | 10-1543154 B1 | 8/2015 |
| KR | 10-1567244 B1 | 11/2015 |
| KR | 10-2016-0025325 A | 3/2016 |

\* cited by examiner

METHOD AND APPARATUS FOR CONTROLLING QUANTITY OF SUCTION AIR

CROSS-REFERENCE(S) TO RELATED APPLICATIONS

The present application claims priority to Korean Patent Application No. 10-2016-0098588, filed on Aug. 2, 2016, the entire contents of which is incorporated herein for all purposes by this reference.

BACKGROUND OF THE INVENTION

Field of the Invention

The present invention relate to a method and an apparatus for controlling a position of a flap of a variable port flap control module (VCM), and more particularly, to a method and an apparatus for controlling a position of a flap of a VCM that control the flap of the VCM to be opened or closed at an optimal position.

Description of Related Art

A variable port flap control module (VCM) is an apparatus that generates a tumble in intake air in an engine to promote mixing of air and fuel in a combustion chamber, such that combustion efficiency of the engine is increased, thereby improving fuel efficiency. The VCM is generally installed at an intake manifold. Describing in more detail, a flap is installed at a position adjacent to a portion of the engine where the intake manifold is mounted. Further, an actuator such as a motor is connected via a link or a gear to rotate the flap.

In order to more easily control the tumble generated in the combustion chamber, it is preferable for the flap to be installed as near as possible to the combustion engine. Therefore, the flap is installed adjacent to the portion of the engine where the intake manifold is mounted, however, since a position adjacent to the engine is interfered by other parts or is a small space, the actuator such as a motor is mounted at a position spaced apart from the flap. Further, the actuator and the flap should be connected to each other via the link or the gear as described above in order to deliver an operating force of the actuator to the flap.

In the above configuration of the VCM according to the related art, a position corresponding to a target value or more is controlled to maintain a state in which the flap is completely opened or closed, even when an error due to heat damage to or assembly deviation of components occurs. That is, it is controlled to additionally apply an offset voltage to the motor. This is because when tolerance occurs in the flap due to heat damage to or assembly deviation of components, knocking or misfire occurs, causing power loss and finally decreasing fuel efficiency.

However, when the above control is performed, the voltage (offset voltage) is applied to the motor in a direction in which the flap continuously rotates even at a position of a stopper, and when repeatedly performing the above mentioned control, the link or the gear connecting between the motor and the flap is damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and an apparatus for controlling a position of a flap of a variable port flap control module (VCM) that control the flap of the VCM to be opened or closed at an optimal position by controlling a voltage applied to a motor of a VCM.

Other objects and advantages of the present invention can be understood by the following description, and become apparent with reference to the embodiments of the present invention. Also, it is obvious to those skilled in the art to which the present invention pertains that the objects and advantages of the present invention can be realized by the device as claimed and combinations thereof.

In accordance with an exemplary embodiment of the present invention, a method for controlling a position of a flap of a variable port flap control module (VCM) includes: determining whether a vehicle state satisfies a predetermined opening condition of the VCM 200 (S110); determining whether a vehicle state satisfies a closing condition of the VCM 200 (S120); determining a VCM opening voltage B1 in consideration of tolerance of the flap 210 of the VCM 200 when the vehicle state satisfies the opening condition of the VCM 200 (S200); and controlling the flap 210 of the VCM 200 to be in an opened state by applying the VCM opening voltage B1 to a motor 220 of the VCM 200 when the opening condition of the VCM 200 is satisfied, during an engine starts (S300).

The method may further include determining a VCM closing voltage B2 in consideration of tolerance of the flap of the VCM (S400) when the closing condition of the VCM is satisfied (S120).

The method may further include controlling the flap 210 of the VCM 200 to be in a closed state by applying the VCM closing voltage B2 to the motor 220 of the VCM 200 when the closing condition of the VCM is satisfied, until the engine stops (S500).

The determining of the VCM opening voltage B1 (S200) may include applying the VCM opening voltage B' determined from the sum of a predetermined VCM open position voltage V1 and a predetermined opening offset voltage A' to the motor 220 (S210).

The determining of the VCM opening voltage B1 (S200) may further include, after the applying of the VCM opening voltage B1 to the motor 220 (S210), determining whether a position variation of the flap 210 per unit time is 0 (S220).

The determining of the VCM opening voltage B1 (S200) may further include determining whether the position variation of the flap 210 per unit time is less than 0, when the position variation of the flap 210 per unit time is not 0 (S230).

When the position variation of the flap 210 per unit time is less than 0, the controlling (S300) may be performed.

The method may further include outputting a VCM fault code when the position variation of the flap 210 per unit time is greater than 0 (S600).

The determining of the VCM opening voltage B1 (S200) may further include decreasing a value of the predetermined opening offset voltage A1 by a predetermined opening offset variation Z1 when the position variation of the flap 210 per unit time is 0 (S240).

After the decreasing (S240), the determining (S100) may be again performed.

The determining of the VCM closing voltage B2 (S400) may include applying the VCM closing voltage B2 determined from the sum of a predetermined VCM close position voltage V2 and a predetermined closing offset voltage A2 to the motor 220 (S410).

The determining of the VCM closing voltage B2 (S400) may further include, after the applying of the VCM closing voltage B2 to the motor 220 (S410), determining whether a position variation of the flap 210 per unit time is 0 (S420).

The determining of the VCM closing voltage B2 (S400) may further include determining whether the position variation of the flap 210 per unit time is greater than 0, when the position variation of the flap 210 per unit time is not 0 (S430).

When the position variation of the flap 210 per unit time is greater than 0, the controlling (S500) may be performed.

When the position variation of the flap 210 per unit time is less than 0, the outputting of the VCM fault code (S600) may be performed.

The determining of the VCM closing voltage B2 (S400) may further include decreasing a value of the predetermined closing offset voltage A2 by a predetermined closing offset variation Z2 when the position variation of the flap 210 per unit time is 0 (S440).

After the decreasing (S440), the determining (S100) may be again performed.

In accordance with another exemplary embodiment of the present invention, an apparatus for controlling a position of a flap of a VCM includes: a storage medium 100 storing the method for controlling a position of a flap of a VCM; the VCM 200 including the flap 210 opening or closing a part of an intake manifold and a motor 220 rotating the flap; a position sensor 300 detecting a position of the flap; a battery 400 applying a voltage to the motor 220; and a controller 500 controlling the position of the flap 210 by controlling the voltage applied to the motor 220 from the battery 400 according to the method for controlling a position of a flap of a VCM that is stored in the storage medium 100, based on the position of the flap 210 detected by the position sensor 300, in which the controller 500 determines a VCM opening voltage B1 in consideration of tolerance of the flap 210 of the VCM 200 when a vehicle state satisfies a predetermined opening condition of the VCM 200, and controls the flap 210 of the VCM 200 to be in an opened state by applying the VCM opening voltage B1 to the motor 220 of the VCM 200 when a position variation of the flap 210 per unit time is less than 0.

The controller 500 may determine a VCM closing voltage B2 in consideration of tolerance of the flap 210 of the VCM 200 when a vehicle state satisfies a predetermined closing condition of the VCM 200, and control the flap 210 of the VCM 200 to be in a closed state by applying the VCM closing voltage B2 to the motor 220 of the VCM 200 when a position variation of the flap 210 per unit time is greater than 0.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
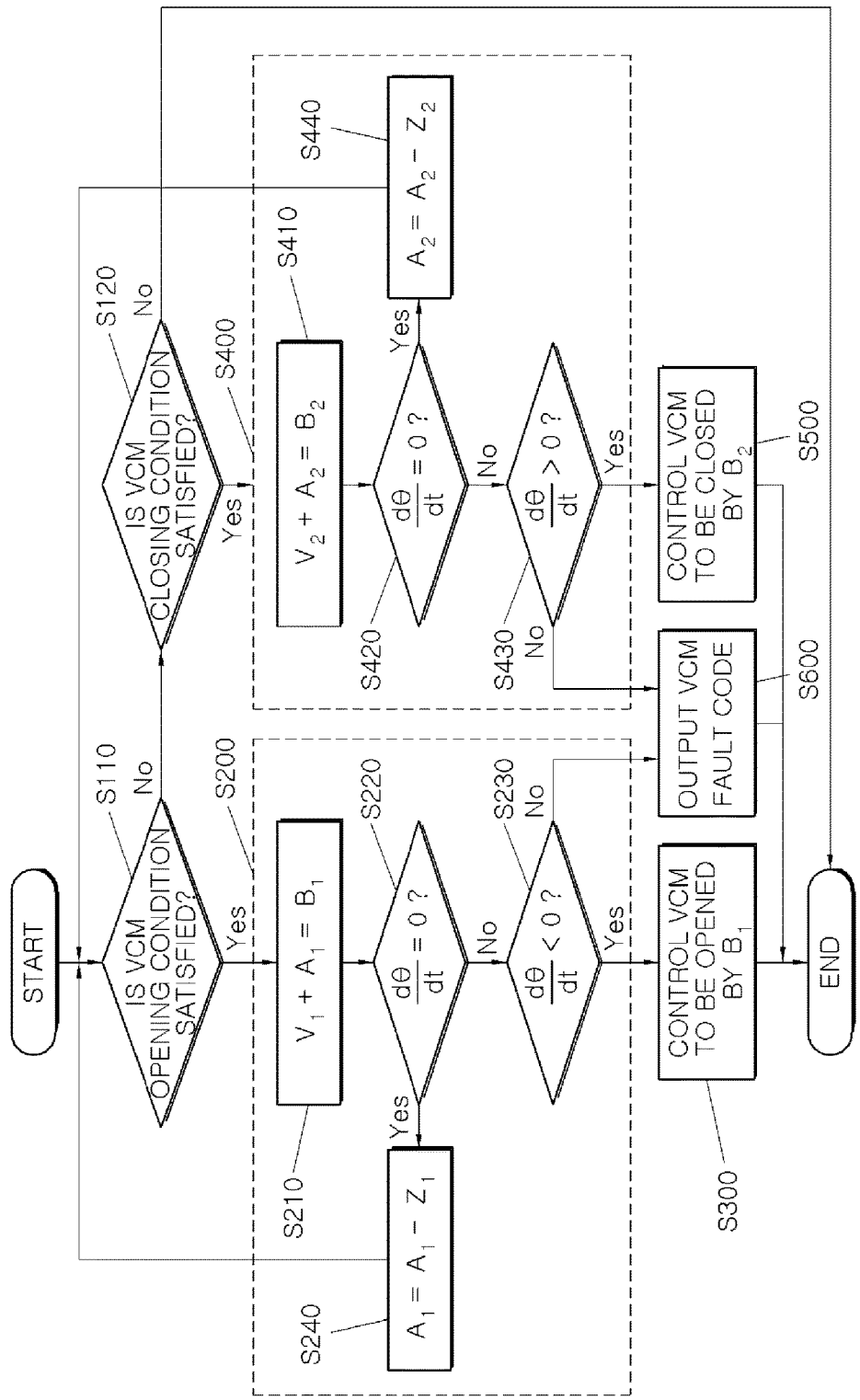
FIG. 1 is flow chart of a method for controlling a position of a flap of a VCM according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is flow chart of a method for controlling a position of a flap of a VCM according to an exemplary embodiment of the present invention. Referring to FIG. 1, a method for controlling a position of a flap of a variable port flap control module (VCM) according to an exemplary embodiment of the present invention includes determining whether a vehicle state satisfies a predetermined opening condition of the VCM 200 (S110), determining whether a vehicle state satisfies a closing condition of the VCM 200 (S120), determining a VCM opening voltage B1 (S200), controlling a flap 210 of the VCM 200 to be in an opened state (S300), determining a VCM closing voltage B2 (S400), controlling the flap 210 of the VCM 200 to be in a closed state (S500), and outputting a VCM fault code (S600).

In the determining whether a vehicle state satisfies the predetermined opening condition of the VCM 200 (S110), it is determined whether a vehicle state satisfies a predetermined opening condition of the VCM 200. Here, the predetermined opening condition is a condition that a tumble is generated in intake air in an engine to promote mixing of air and fuel in a combustion chamber, such that combustion efficiency of the engine is increased, improving fuel efficiency, which may be variously set depending on an intention of a designer.

In the determining of the VCM opening voltage B1 (S200), when the vehicle state satisfies the opening condition of the VCM 200, the VCM opening voltage B1 is determined in consideration of tolerance of the flap 210 of the VCM 200. A detailed description for the determining of the VCM opening voltage B1 (S200) will be provided below.

In the controlling of the flap 210 of the VCM 200 to be in an opened state (S300), when the opening condition of the VCM 200 is satisfied during the engine starts, the VCM opening voltage B1 is applied to a motor 220 of the VCM 200 to control the flap 210 of the VCM 200 to be in the opened state. That is, the VCM opening voltage B1 determined in the determining of the VCM opening voltage B1

(S200) is a voltage controlling the flap of the VCM to be opened at the optimal position.

Therefore, when the opening condition of the VCM 200 is satisfied until the engine stops, the VCM opening voltage B1 is applied to a motor 220 of the VCM 200 to control the flap 210 of the VCM 200 to be in the opened state. Accordingly, even though the flap 210 may not rotate any more by a stopper P, excessive offset voltage is not applied to the motor 220, preventing a gear G, or the like from being damaged. Further, even when an open position of the flap 210 is changed due to durability deterioration, the changed position may be reflected, preventing fuel efficiency from being decreased due to durability deterioration of related components.

In the determining of the VCM closing voltage B2 (S400), when a closing condition of the VCM is satisfied, in the determining whether a vehicle state satisfies the closing condition of the VCM 200 (S120),), the VCM closing voltage B2 is determined in consideration of the tolerance of the flap of the VCM. A detailed description for the determining of the VCM closing voltage B2 (S400) will be provided below.

In the controlling of the flap 210 of the VCM 200 to be in a closed state (S500), when the closing condition of the VCM is satisfied during the engine starts, the VCM closing voltage B2 is applied to the motor 220 of the VCM 200 to control the flap 210 of the VCM 200 to be in the closed state. That is, the VCM closing voltage B2 determined in the determining of the VCM closing voltage B2 (S400) is a voltage controlling the flap of the VCM to be closed at the optimal position.

Therefore, when closing condition of the VCM 200 is satisfied until the engine stops, the VCM closing voltage B2 is applied to the motor 220 of the VCM 200 to control the flap 210 of the VCM 200 to be in the closed state. Accordingly, even though the flap 210 may not rotate any more by the stopper P, excessive offset voltage is not applied to the motor 220, preventing the gear G, or the like from being damaged. Further, even when a close position of the flap 210 is changed due to durability deterioration, the changed position may be reflected, preventing fuel efficiency from being decreased due to durability deterioration of related components.

Hereinafter, the determining of the VCM opening voltage B1 (S200) will be described in detail.

The determining of the VCM opening voltage B1 (S200) first includes applying the VCM opening voltage B1 determined from the sum of a predetermined VCM open position voltage V1 and a predetermined opening offset voltage A1 to the motor 220 (S210). That is, an initial VCM opening voltage B1 is set as the sum of the VCM open position voltage V1 and the predetermined opening offset voltage A1.

The predetermined VCM open position voltage V1 is a voltage applied to the motor 220 to rotate the flap 210 to the open position, which may be set to be different depending on a shape of the flap 210 or a size of the motor 220. The flap 210 may rotate to the open position (that is, a position where the flap 210 contacts the stopper S) only with the predetermined VCM open position voltage V1, however, when an error occurs due to heat damage or assembly deviation of components, the flap 210 may not rotate up to the open position. Therefore, to prevent this situation, the predetermined opening offset voltage A1 is set.

The predetermined opening offset voltage A1 is applied to the motor 220 to rotate the flap 210 more over the open position (that is, the position where the flap 210 contacts the stopper S). By doing so, the flap 210 rotates up to a complete open position. The predetermined opening offset voltage A1 may be set to be 0.4 V, but is not necessarily limited thereto, and may also be set to be different depending on the shape of the flap 210 or the size of the motor 220.

The determining of the VCM opening voltage B1 (S200) includes, after the applying of the VCM opening voltage B1 to the motor 220 (S210), determining whether a position variation of the flap 210 per unit time is 0 (S220). When the position variation of the flap 210 per unit time is 0, it means that the flap 210 reaches the position where the flap 210 contacts the stopper S, thus it may be determined that the flap 210 rotates up to the complete open position. Meanwhile, since a voltage variation of the VCM per unit time is relevant to the position variation of the flap 210 per unit time, when the voltage variation of the VCM per unit time is 0, it means that the flap 210 reaches the position where the flap 210 contacts the stopper S, thus it may be determined that the flap 210 rotates up to the complete open position.

Accordingly, it may be confirmed that the initial VCM opening voltage B1 that is the sum of the VCM open position voltage V1 and the predetermined opening offset voltage A1 is sufficiently large, and it is determined that the flap 210 may rotate up to the complete open position even when the VCM opening voltage B1 is gradually decreased.

The determining of the VCM opening voltage B1 (S200) includes determining whether the position variation of the flap 210 per unit time is less than 0 when the position variation of the flap 210 per unit time is not 0 (S230). That is, as described above, when the position variation of the flap 210 per unit time is 0, it means that the flap 210 rotates up to the complete open position, and when the position variation of the flap 210 per unit time is not 0, it means that a fault of the VCM 200 occurs or the flap 210 rotates up to immediately before reaching the complete open position. Also, when the voltage variation of the VCM per unit time is not 0, it means that a fault of the VCM 200 occurs or the flap 210 rotates up to immediately before reaching the complete open position.

Describing in more detail, the flap 210 contacts the stopper S, and thus may not rotate more over the complete open position. In spite of this, when the position variation of the flap 210 per unit time is greater than 0, it means that a fault of the VCM 200 or a position sensor 300 occurs. Therefore, when the position variation of the flap 210 per unit time is greater than 0, the outputting of the VCM fault code (S600) is performed.

Further, when the position variation of the flap 210 per unit time is less than 0, the flap 210 rotates up to immediately before reaching the complete open position as described above. Therefore, it may be determined that the VCM opening voltage B1 at this time is an optimal voltage for rotating the flap 210 to the complete open position. Accordingly, when the position variation of the flap 210 per unit time is less than 0, the controlling (S300) is performed.

The determining of the VCM opening voltage B1 (S200) includes decreasing a value of the predetermined opening offset voltage A1 by a predetermined opening offset variation Z1 when the position variation of the flap 210 per unit time is 0 (S240).

When the position variation of the flap 210 per unit time is 0, it means that the flap 210 reaches the position where the flap 210 contacts the stopper S, thus it may be determined that the flap 210 rotates up to the complete open position. Therefore, it may be confirmed that the initial VCM opening voltage B1 that is the sum of the VCM open position voltage V1 and the predetermined opening offset voltage A1 is sufficiently large.

By doing so, an optimal voltage for rotating the flap 210 to the complete open position may be derived while gradually decreasing the VCM opening voltage B1, and To this end, after the decreasing (S240), the determining (S100) may be performed again.

In the instant case, the predetermined opening offset variation Z1 may be set to be 0.01 V, but is not necessarily limited thereto, and may be set to be different depending on the intention of the designer. That is, when the predetermined opening offset variation Z1 is set to be large, the optimal voltage may be derived more quickly, and when the predetermined opening offset variation Z1 is set to be small, the optimal voltage may be more accurately derived.

Hereinafter, the determining of the VCM closing voltage B2 (S400) will be described in detail.

The determining of the VCM closing voltage B2 (S400) first includes applying the VCM closing voltage B2 determined from the sum of a predetermined VCM close position voltage V2 and a predetermined closing offset voltage A2 to the motor 220 (S410). That is, an initial VCM closing voltage B2 is set as the sum of the predetermined VCM close position voltage V2 and the predetermined closing offset voltage A2.

The predetermined VCM close position voltage V2 is a voltage applied to the motor 220 to rotate the flap 210 to the close position, which may be set to be different depending on a shape of the flap 210 or a size of the motor 220. The flap 210 may rotate to the close position (that is, the position where the flap 210 contacts the stopper S) only with the predetermined VCM close position voltage V2, however, when an error occurs due to heat damage or assembly deviation of components, the flap 210 may not rotate up to the close position. Therefore, to prevent this situation, the predetermined closing offset voltage A2 is set.

The predetermined closing offset voltage A2 is applied to the motor 220 to rotate the flap 210 more over the close position (that is, the position where the flap 210 contacts the stopper S). By doing so, the flap 210 rotates up to a complete close position. The predetermined closing offset voltage A2 may be set to be 0.4 V, but is not necessarily limited thereto, and may also be set to be different depending on the shape of the flap 210 or the size of the motor 220.

The determining of the VCM closing voltage B2 (S400) includes, after the applying of the VCM closing voltage B2 to the motor 220 (S410), determining whether a position variation of the flap 210 per unit time is 0 (S420). When the position variation of the flap 210 per unit time is 0, it means that the flap 210 reaches the position where the flap 210 contacts the stopper S, thus it may be determined that the flap 210 rotates up to the complete close position. Meanwhile, since a voltage variation of the VCM per unit time is relevant to the position variation of the flap 210 per unit time, when the voltage variation of the VCM per unit time is 0, it means that the flap 210 reaches the position where the flap 210 contacts the stopper S, thus it may be determined that the flap 210 rotates up to the complete close position.

Accordingly, it may be confirmed that the initial VCM closing voltage B2 that is the sum of the VCM close position voltage V2 and the predetermined closing offset voltage A2 is sufficiently large, and it is determined that the flap 210 may rotate up to the complete close position even when the VCM closing voltage B2 is gradually decreased.

The determining of the VCM closing voltage B2 (S400) includes determining whether the position variation of the flap 210 per unit time is less than 0 when the position variation of the flap 210 per unit time is not 0 (S430). That is, as described above, when the position variation of the flap 210 per unit time is 0, it means that the flap 210 rotates up to the complete close position, and when the position variation of the flap 210 per unit time is not 0, it means that a fault of the VCM 200 occurs or the flap 210 rotates up to immediately before reaching the complete close position. Also, when the voltage variation of the VCM per unit time is not 0, it means that a fault of the VCM 200 occurs or the flap 210 rotates up to immediately before reaching the complete close position. Describing in more detail, the flap 210 contacts the stopper S, and may not rotate more over the complete close position. In spite of this, when the position variation of the flap 210 per unit time is more than 0, it means that a fault of the VCM 200 or the position sensor 300 occurs. Therefore, when the position variation of the flap 210 per unit time is greater than 0, the outputting of the VCM fault code (S600) is performed.

Further, when the position variation of the flap 210 per unit time is less than 0, the flap 210 rotates up to immediately before reaching the complete close position as described above. Therefore, it may be determined that the VCM closing voltage B2 at this time is an optimal voltage for rotating the flap 210 to the complete close position. Accordingly, when the position variation of the flap 210 per unit time is less than 0, the controlling (S500) is performed.

The determining of the VCM closing voltage B2 (S400) includes decreasing a value of the predetermined closing offset voltage A2 by a predetermined closing offset variation Z2 when the position variation of the flap 210 per unit time is 0 (S440).

When the position variation of the flap 210 per unit time is 0, it means that the flap 210 reaches the position where the flap 210 contacts the stopper S, thus it may be determined that the flap 210 rotates up to the complete close position. Therefore, it may be confirmed that the initial VCM closing voltage B2 that is the sum of the VCM close position voltage V2 and the predetermined closing offset voltage A2 is sufficiently large.

By doing so, an optimal voltage for rotating the flap 210 to the complete close position may be derived while gradually decreasing the VCM closing voltage B2, and To this end, after the decreasing (S440), the determining (S100) may be performed again.

In the instant case, the predetermined closing offset variation Z2 may be set to be 0.01 V, but is not necessarily limited thereto, and may be set to be different depending on the intention of the designer. That is, when the predetermined closing offset variation Z2 is set to be large, the optimal voltage may be derived more quickly, and when the predetermined closing offset variation Z2 is set to be small, the optimal voltage may be more accurately derived.

Figure 2:
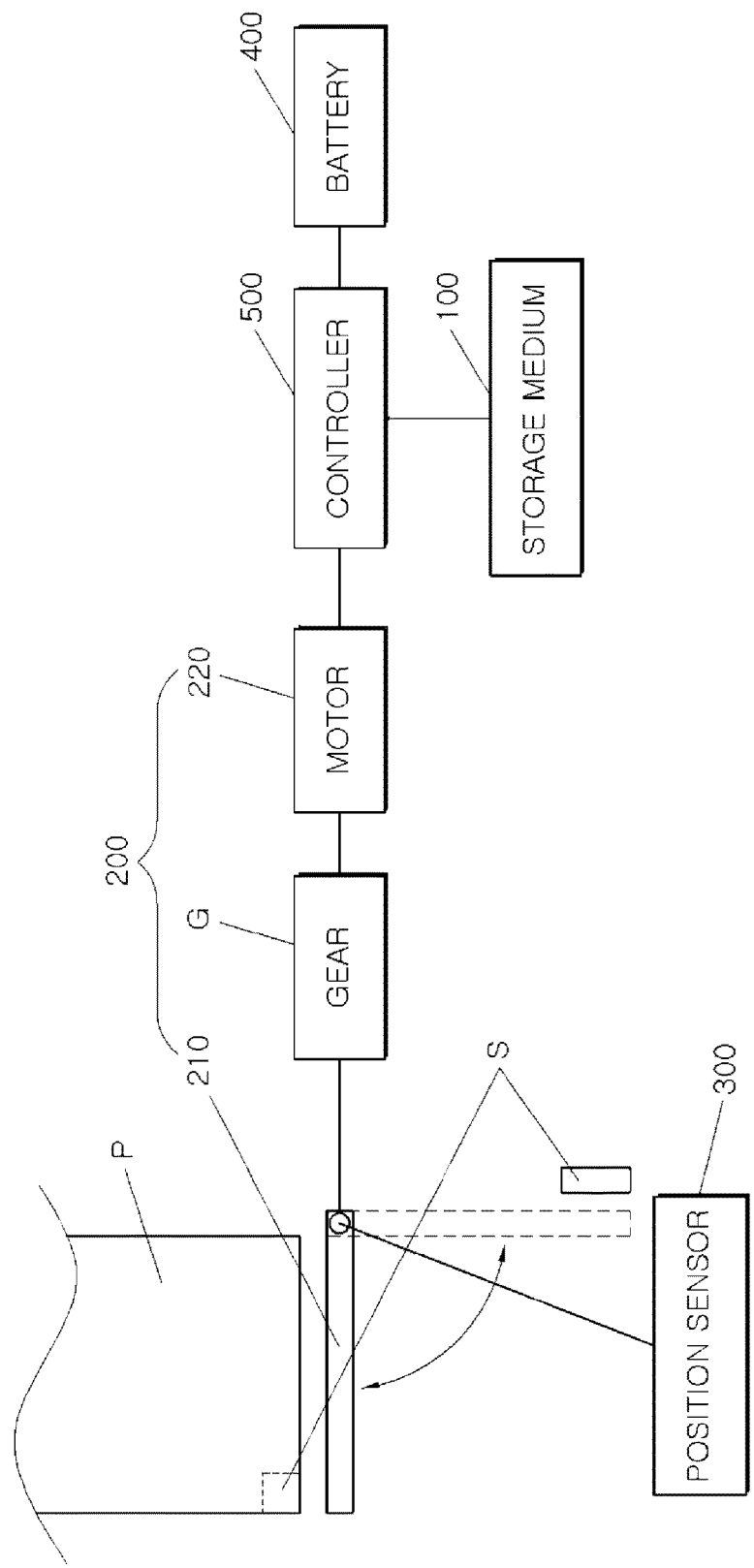
FIG. 2 is a block diagram of an apparatus for controlling a position of a flap of a VCM according to an exemplary embodiment of the present invention.

FIG. 2 is a block diagram of an apparatus for controlling a position of a flap of a VCM according to an exemplary embodiment of the present invention. Referring to FIG. 2, an apparatus for controlling a position of a flap of a VCM according to an exemplary embodiment of the present invention includes a storage medium 100, a VCM 200, a position sensor 300, a battery 400, and a controller 500.

The storage medium 100 stores the method for controlling a position of a flap of a VCM.

The VCM 200 includes a flap 210 opening or closing a port P of an intake manifold and a motor 220 rotating the flap 210. Further, the VCM 200 may include a gear G connecting between the motor 220 and the flap 210, and a stopper S mounted at the port P to physically limit a close position of the flap 210.

The position sensor 300 serves to sense a position of the flap 210, and the battery 400 serves to apply a voltage to the motor 220.

The controller 500 serves to control the position of the flap 210 by controlling the voltage applied to the motor 220 from the battery 400 according to the method for controlling a position of a VCM flap that is stored in the storage medium 100, based on the position of the flap 210 detected by the position sensor 300.

Describing in more detail, the controller 500 may determine a VCM opening voltage B1 in consideration of tolerance of the flap 210 of the VCM 200 when a vehicle state satisfies a predetermined opening condition of the VCM 200, and control the flap 210 of the VCM 200 to be in an opened state by applying the VCM opening voltage B1 to the motor 220 of the VCM 200 when a position variation of the flap 210 per unit time is less than 0.

Further, the controller 500 may determine a VCM closing voltage $B_2$ in consideration of tolerance of the flap 210 of the VCM 200 when a vehicle state satisfies a predetermined closing condition of the VCM 200, and control the flap 210 of the VCM 200 to be in a closed state by applying the VCM closing voltage $B_1$ to the motor 220 of the VCM 200 when a position variation of the flap 210 per unit time is greater than 0.

In accordance with the embodiment of the present invention, the flap of the VCM may be controlled to be opened or closed at an optimal position, preventing the gear or the like from being damaged.

Further, even when the open position or the close position of the flap is changed due to durability deterioration, the changed position may be reflected, preventing fuel efficiency from being decreased due to durability deterioration of related components.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a position of a flap of a variable port flap control module (VCM), including:
   determining whether a vehicle state satisfies a predetermined opening condition of the VCM;
   determining whether the vehicle state satisfies a closing condition of the VCM 200;
   determining a VCM opening voltage in consideration of tolerance of the flap of the VCM when the vehicle state satisfies the predetermined opening condition of the VCM; and
   controlling the flap of the VCM to be in an opened state by applying the VCM opening voltage to a motor of the VCM when the predetermined opening condition of the VCM is satisfied, during an engine starts.

2. The method of claim 1, further including:
   determining a VCM closing voltage in consideration of tolerance of the flap of the VCM when the closing condition of the VCM is satisfied.

3. The method of claim 2, further including:
   controlling the flap of the VCM to be in a closed state by applying the VCM closing voltage to the motor of the VCM when the closing condition of the VCM is satisfied, until the engine stops.

4. The method of claim 1, wherein the determining of the VCM opening voltage includes applying the VCM opening voltage determined from a sum of a predetermined VCM open position voltage and a predetermined opening offset voltage to the motor.

5. The method of claim 4, wherein the determining of the VCM opening voltage further includes, after the applying of the VCM opening voltage to the motor, determining whether a position variation of the flap per unit time is 0.

6. The method of claim 5, wherein the determining of the VCM opening voltage further includes determining whether the position variation of the flap per unit time is less than 0 when the position variation of the flap per unit time is not 0.

7. The method of claim 6, wherein when the position variation of the flap per unit time is less than 0, the controlling is performed.

8. The method of claim 6, further including:
   outputting a VCM fault code when the position variation of the flap per unit time is greater than 0.

9. The method of claim 5, wherein the determining of the VCM opening voltage further includes decreasing a value of the predetermined opening offset voltage by a predetermined opening offset variation when the position variation of the flap per unit time is 0.

10. The method of claim 9, wherein after the decreasing, the determining is again performed.

11. The method of claim 3, wherein the determining of the VCM closing voltage includes applying the VCM closing voltage determined from a sum of a predetermined VCM close position voltage and a predetermined closing offset voltage to the motor.

12. The method of claim 11, wherein the determining of the VCM closing voltage further includes, after the applying of the VCM closing voltage to the motor, determining whether a position variation of the flap per unit time is 0.

13. The method of claim 12, wherein the determining of the VCM closing voltage further includes determining whether the position variation of the flap per unit time is greater than 0 when the position variation of the flap per unit time is not 0.

14. The method of claim 13, wherein when the position variation of the flap per unit time is greater than 0, the controlling is performed.

15. The method of claim 13, wherein when the position variation of the flap per unit time is less than 0, the outputting of the VCM fault code is performed.

16. The method of claim 12, wherein the determining of the VCM closing voltage further includes decreasing a value of the predetermined closing offset voltage by a predetermined closing offset variation when the position variation of the flap per unit time is 0.

17. The method of claim 16, wherein after the decreasing, the determining is again performed.

18. An apparatus for controlling a position of a flap of variable port flap control module (VCM), including:
- a storage medium storing a method for controlling the position of the flap of the VCM;
- the VCM including the flap opening or closing a port of an intake manifold and a motor rotating the flap;
- a position sensor detecting the position of the flap;
- a battery applying a voltage to the motor; and
- a controller controlling a position of the flap by controlling the voltage applied to the motor from the battery according to the method for controlling a position of a VCM flap that is stored in the storage medium, based on the position of the flap detected by the position sensor,
- wherein the controller is configured to determine a VCM opening voltage in consideration of tolerance of the flap of the VCM when a vehicle state satisfies a predetermined opening condition of the VCM, and controls the flap of the VCM to be in an opened state by applying the VCM opening voltage to the motor of the VCM when a position variation of the flap per unit time is less than 0.

19. The apparatus of claim 18, wherein the controller is configured to determine a VCM closing voltage in consideration of tolerance of the flap of the VCM when the vehicle state satisfies a predetermined closing condition of the VCM, and controls the flap of the VCM to be in a closed state by applying the VCM closing voltage to the motor of the VCM when the position variation of the flap per unit time is greater than 0.

* * * * *